United States Patent [19]
Radecki

[11] 3,762,650
[45] Oct. 2, 1973

[54] ADJUSTABLE SPRAY HEAD
[75] Inventor: Tony Radecki, Glendale, Calif.
[73] Assignee: Modern Faucet Mfg. Co., Los Angeles, Calif.
[22] Filed: Sept. 5, 1972
[21] Appl. No.: 286,560

[52] U.S. Cl............. 239/396, 239/444, 239/536, 239/568, 239/598
[51] Int. Cl............................................. B05b 1/16
[58] Field of Search................... 239/390, 396, 394, 239/436, 443, 444, 536, 553.3, 554, 555, 568, 598

[56] References Cited
UNITED STATES PATENTS

| | | | |
|---|---|---|---|
| 2,132,333 | 10/1938 | Wendell et al..................... | 239/394 |
| 2,619,378 | 11/1952 | Watkins et al...................... | 239/390 |
| 2,790,680 | 4/1957 | Rosholt.............................. | 239/396 |
| 2,785,005 | 3/1957 | Thompson......................... | 239/598 |
| 2,964,248 | 12/1960 | O'Brien et al..................... | 239/568 |
| 3,704,831 | 12/1972 | Clark.................................. | 239/394 |
| 3,715,080 | 2/1973 | Bastide.............................. | 239/444 |

FOREIGN PATENTS OR APPLICATIONS

| 154,677 | 1/1954 | Australia........................... | 239/394 |
|---|---|---|---|

Primary Examiner—Robert S. Ward, Jr.
Attorney—Charles G. Lyon et al.

[57] ABSTRACT

An adjustable spray head for use in spray irrigation which comprises a body member adapted to be secured to a pressurized water source and having a pair of outlet apertures therein, a disc carried within the body member and having a plurality of varying sized orifices therethrough, a selector for aligning the desired size orifice with one of the outlet apertures and a deflector positioned over each of the outlet apertures for causing the water flow through each of the apertures to be sprayed over a different area.

14 Claims, 5 Drawing Figures

PATENTED OCT 2 1973　　　　　　　　3,762,650

3,762,650

ADJUSTABLE SPRAY HEAD

BACKGROUND OF THE INVENTION

There are several variations of spray heads currently available for use in spray irrigation. Such heads, however, are generally quite limited in function. They have a single spray area and no means for regulating the flow therethrough. One such head may be adapted for spraying a portion of a lawn and consequently sprays water radially therefrom in all directions. Another head may be used to spray a flower bed and is therefore designed to spray a set area of approximately 180°. Such heads are completely inflexible in that they spray only the area for which they are designed and hence are of limited utility. While more versatile devices are available, they generally utilize a moving jet of water which is unsuitable for watering beds of delicate flowers and, in addition, their size frequently renders them quite impractical. There are several situations where it would be desirable to have a small spray head which is capable of spraying more than one set area.

A second shortcoming of standard spray heads is their failure to provide effective spray rate regulation. The rate of spray through available heads is generally controlled solely by means of the main valve handle in the spray system, making individual control impossible and general control merely a function of the water pressure entering the spray heads. As a result, if a reduced spray rate is desired, the overall pressure must be reduced which in turn reduces the area of spray. In many situations, it is desirable to maintain the area of spray while merely decreasing the flow rate into that area. This flexibility is generally unavailable with existing spray heads.

It is therefore the principal object of this invention to provide a flexible spray head for use in spray irrigation.

It is another object of this invention to provide a spray head which is capable of spraying more than one set area.

It is a further object of this invention to provide a spray head which has means thereon for regulating the flow rate therethrough.

It is a still further object of this invention to provide a spray head which is easily adjustable with respect to area and spray rate regulation.

It is yet another object of this invention to provide a spray head which is small in size and versatile in use.

These and other objects and advantages of the present invention will become apparent upon the following detailed description taken in conjunction with the following drawings.

SUMMARY OF THE INVENTION

Briefly, the invention comprises a spray head for spray irrigation which has a first outlet aperture disposed to one side thereof and below a deflector which causes water passing therethrough to be sprayed over a given area and a second outlet aperture disposed to the opposite side of the spray head from the first outlet aperture and similarly positioned below a second deflector which causes water passing through the second outlet aperture to be sprayed over a second given area, generally of a different size from the first area. A selector is provided for aligning varying sized orifices with one of the two outlet apertures for regulating the fluid flow through the aligned aperture.

IN THE DRAWINGS

Figure 5:
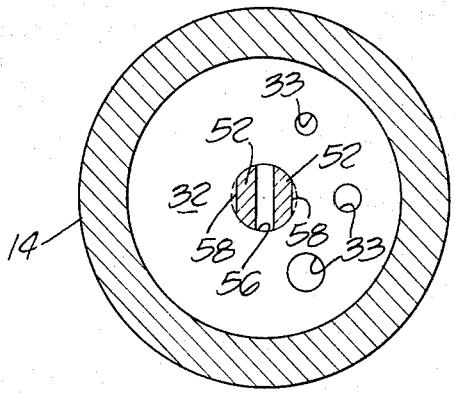
FIG. 5 is a sectional view of the spray head taken along line 5—5 in FIG. 2, illustrating the orifice disc.

Referring now in detail to the drawings, the spray head 10 is comprised of a body member 12 having a cylindrical lower portion 14 and flared upper portion 16. The cylindrical lower portion 14 of the body member 12 has an open lower end 18 and an upper flat surface 20. Internal threads 22 are provided in the lower portion for threaded communication with a water pipe 24. The upper surface 20 of the lower portion has a pair of outlet apertures 26 and 28 therethrough which communicate the area 30 between the surface 20 and the flared upper portion 16 of the body member with water pipe 24. A disc 32 having a plurality of differently sized orifices 33 therein (three being shown in the drawings — see FIG. 5) is disposed within the lower portion 14 of the body member between a bottom seal washer 34 and gasket 36. The gasket 36 has a pair of apertures 38 and 40 therethrough which are in axial alignment with outlet apertures 26 and 28.

An annular core member 44 is centrally disposed within the body member 12. The core member 44 has a cup shaped upper portion 46 and lower stem portion 48. The stem portion is bifurcated at the lower end thereof, thereby defining a pair of activating arms 52. The activating arms have tapered sides 54 for facilitating insertion thereof through a central aperture 56 in disc 32 during assembly. Notches 58 are provided in arms 52 to lock the core member 44 within body member 12. It will be noted that the configuration of the aperture 56 in disc 32 is such that upon rotation of the core member 44 with respect to the body member, disc 32 is caused to rotate with the core member causing alternating alignment of the orifices 33 in disc 32 with the outlet apertures 26 and 28. The external surface of the upper portion of the core member has knurls 60 thereon to facilitate rotation of the core member disc 32.

Figure 2:
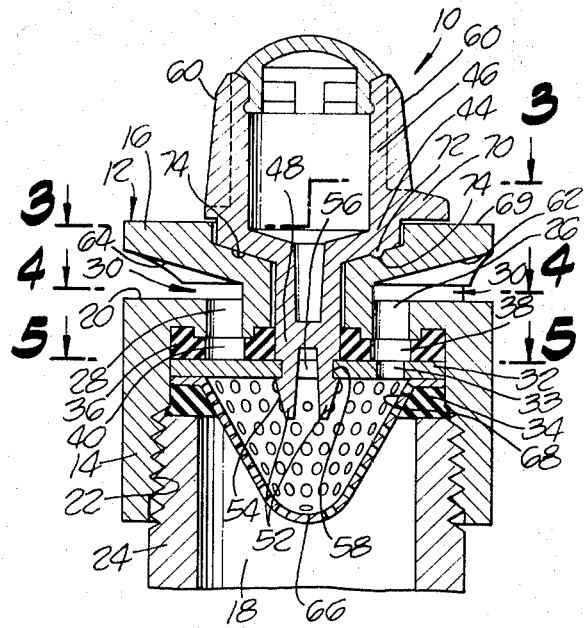
FIG. 2 is a sectional view of the spray head taken along 2—2 in FIG. 1.
Figure 4:
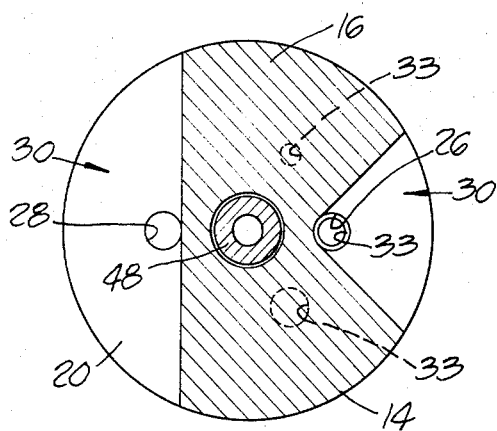
FIG. 4 is a sectional view of the spray head taken along line 4—4 in FIG. 2, illustrating the area covered by the deflecting surfaces.

The underside of the flared upper portion 16 of base member 12 defines a pair of deflecting surfaces 62 and 64. Surface 62 is disposed above outlet aperture 26 and is sloped such as to cause water exiting aperture 26 to spray out over a given area. The drawings are illustrative of a surface which would cause a fan spray of about 90°. Deflecting surface 64 is disposed above outlet aperture 28 and is sloped such as to cause water exiting that aperture to spray over a second given area. The drawings show a surface which would cause water passing through outlet aperture 64 to be sprayed over an area of about 180° [see FIGS. 2 and 4]. It is to be understood that these outlet surfaces could be varied for different applications, however, in the preferred embodiment the two deflecting surfaces should cause sprays covering different areas to increase the flexibility of the spray head. A conically shaped screen 66 is positioned below disc 32 to prevent any particulate matter from clogging the orifices in disc 32 or the outlet apertures in the body member which would intefer with the functioning of the device. It should be noted that bottom seal washer 34 has sloped sides 68 to accommodate the conically shaped screen 66 and maintain said screen within the lower portion of the body member.

Figure 1:
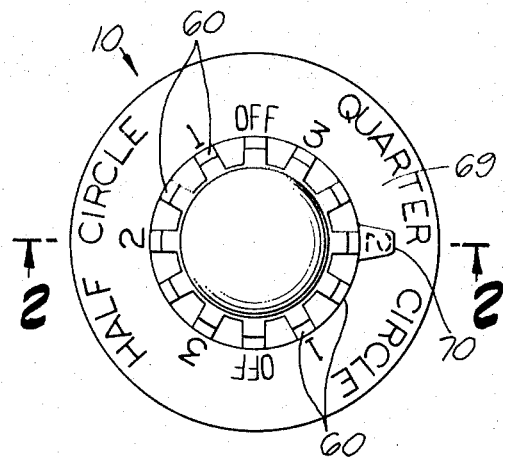
FIG. 1 is a plan view of the spray head.
Figure 3:
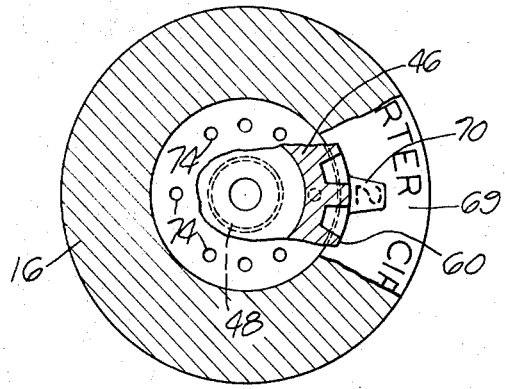
FIG. 3 is a sectional view of the spray head taken along line 3—3 in FIG. 2.

In use, the spray head 10 is secured to a water pipe 24 and tightened thereon until the desired deflector surface 62 or 64 faces the area to be sprayed. Gasket 36 is constructed of a compressible material to allow rotation of the spray head on the water pipe by as much as three quarters of a turn beyond the point where a water tight seal has been accomplished, thereby providing great flexibility in the angular orientation of the spray head on the water pipe. Once the spray head is properly positioned, the disc 32 carried within the body member 12 is rotated until the desired sized orifice 33 therein is aligned with the outlet aperture 26 or 28 which is disposed below the deflector surface facing the area to be sprayed. This alignment is accomplished by rotating the core member 44 which is secured to the disc 32 by activating arms 52 which extend through the central aperture 56 in disc 32, as described above. To enable the user to know which orifice has been aligned with the outlet aperture, printed numbers [1–3 being shown for a three aperture disc] are printed on the upper flat surface 69 of the upper portion 16 of the body member 12, as shown in FIG. 1. An indicator knob 70 extends outwardly from the core member and is adapted to point at one of the printed members on the flat surface 69 when the correspnding orifice on disc 32 is in alignment with the outlet aperture 26 or 28. The numbers, of course, are indicative of the size of the orifice in the disc 32 through which the flowing water must pass, and, as will be explained, determine the flow rate from the spray head. A small detent 72 is provided on the underside of the core member and fits into one of a number of notches 74 in the flared portion of the body member to indicate exact axial alignment of the outlet aperture with one of the orifices 32 in disc 32. One such notch is provided for each of the orifices, as seen in FIG. 3. The detent also acts to maintain the orifice and aperture in proper alignment during use. Therefore, one orients the proper orifice in disc 32 with the desired outlet aperture by turning the core member, for which the knurled surface is provided, until the indicator knob 70 points to the printed number of the desired orifice, whereupon the detent 72 will depress into a notch 74. When the valve associated with the water pipe 24 is opened, water passes into the spray head 10 through the open lower end 18, through one of the orifices 33 in disc 32 and out the outlet aperture 26 or 28 aligned therewith. The water then strikes the deflector surface positioned above the aligned outlet aperture and is caused to spray out over the area defined by the particular deflector surface. In the preferred embodiment, two different areas of spray are available due to the variance in deflector surfaces 62 and 64. These two surfaces are, however, oppositely disposed and proper orientation of the desired surface with respect to the area to be sprayed is attained through the initial orientation of the spray head on the pipe, as discussed above.

While the flexibility of the device with respect to spray area is attained through the initial orientation of the head on the water pipe 24 and by the deflector surfaces on the underside of the flared portion of the body member, the flow rate of water from the spray head is determined by the choice of orifice alignment in the disc 32 with the outlet aperture. When a larger disc [No. 3 in the drawings] is in alignment with an outlet aperture 26 or 28, a large flow rate is attained. A smaller flow rate would result from the alignment of a smaller orifice with the outlet aperture, as less water could flow therethrough. In this manner a varying number of flow rates can be obtained, which rates are determined by the size and number of orifices provided in disc 32 which can be brought into axial alignment with outlet apertures 26 and 28.

Various changes and modifications can be made in carrying out the instant invention without departing from the scope and spirit thereof. Insofar as these changes and modifications are within the purview of the appended claims, they are to be considered as part of the invention.

I claim:

1. An adjustable spray head comprising a body member having an inlet and a pair of outlet apertures, said inlet being adapted for communication with a water pipe, means for selectively directing water entering said body member through said inlet to one of said outlet apertures, means carried by said body member for regulating the rate of water flow through said outlet aperture and means for causing water exiting said outlet aperture to spray over a given area.

2. The combination of claim 1 wherein said spray causal means comprises a deflector surface disposed over each of said outlet apertures so that water exiting one of said apertures will strike a deflecting surface and be deflected over a given area.

3. The combination of claim 1 wherein said spray causal means comprises a first deflecting surface disposed over one of said apertures so that water exiting said outlet aperture will strike said deflecting surface and be deflected over a given area and a second deflecting surface disposed over the other of said outlet apertures so that water exiting said other outlet aperture will strike said second deflecting surface and be deflected over a second given area, said first and second deflecting means being carried by and oppositely disposed with respect to said body member.

4. The combination of claim 3 wherein said first given area is greater than said second given area.

5. The combination of claim 3 wherein said first given area is within the range of approximately a 120° to 190° and said second area is within the range of approximately 75° to 100°.

6. The combination of claim 3 wherein said first given area is approximately 180° and said second area is approximately 90°.

7. An adjustable spray head comprising a body member having an inlet and a pair of outlet apertures, said inlet being adapted for communication with a water pipe, a disc carried within said body member and having a plurality of orifices therethrough, said orifices being of varying size, means operable to align one of said orifices within said disc with one of said outlet apertures and means for deflecting water exiting one of said outlet apertures such that said water is sprayed over a given area.

8. The combination of claim 7 wherein said deflecting means comprises a first deflecting surface disposed over one of said outlet apertures so that water exiting said outlet aperture will strike said deflecting surface and be deflected over a given area and a second deflecting surface disposed over the other outlet aperture so that water exiting said other outlet aperture will strike said second deflecting surface and be deflected over a second given area, said first and second deflecting surfaces being carried by oppositely disposed with respect to said body member.

9. The combination of claim 8 wherein said first given area is greater than said second given area.

10. The combination of claim 8 wherein said first given area is within the range of approximately 120° to 190° and said second area is within the range of approximately 75° to 100°.

11. The combination of claim 8 wherein said first given area is approximately 180° and said second given area is approximately 90°.

12. The combination of claim 7 wherein said operable aligning means comprises a core member carried by said body member and rotatable with respect thereto, said core member being secured to said disc so that upon rotating said core member with respect to said body member, said orifices in said disc are brought into alternate axial alignment with one of said outlet apertures.

13. The combination of claim 12 including means for indicating and maintaining axial alignment of one of said orifices in said disc with one of said outlet apertures.

14. The combination of claim 12 wherein said deflecting means comprises a first deflecting surface disposed over one of the said outlet apertures so that water exiting said outlet aperture will strike said deflecting surface and be deflected over a given area and a second deflecting surface disposed over the other outlet aperture so that water exiting said other outlet aperture will strike said second deflecting surface and be deflected over a second given area, said first and second deflecting surfaces being carried by an oppositely disposed with respect to said body member.

* * * * *